United States Patent [19]

Geluk et al.

[11] Patent Number: 5,042,303
[45] Date of Patent: Aug. 27, 1991

[54] APPARATUS FOR ULTRASOUND DETECTION

[75] Inventors: Ronald J. Geluk, Nootdorp; Marcel R. de la Fonteijne, Delft, both of Netherlands

[73] Assignee: B.V. Optische Industrie "de Oude Delft", Delft, Netherlands

[21] Appl. No.: 509,486

[22] Filed: Apr. 16, 1990

Related U.S. Application Data

[63] Continuation of Ser. No. 289,616, Dec. 23, 1988, abandoned, which is a continuation of Ser. No. 16,532, Feb. 19, 1987, abandoned.

[30] Foreign Application Priority Data

Feb. 21, 1986 [NL] Netherlands ........................ 8600444

[51] Int. Cl.$^5$ ............................................. G01N 29/00
[52] U.S. Cl. .................................. 73/602; 128/660.07; 73/620
[58] Field of Search .................. 73/602, 615, 620, 629, 73/631; 128/660.07

[56] References Cited

U.S. PATENT DOCUMENTS

| | | | |
|---|---|---|---|
| 3,486,368 | 12/1969 | Brech | 73/615 |
| 3,934,458 | 1/1976 | Beretsky et al. | 73/602 |
| 4,043,181 | 8/1977 | Nigam | 73/631 |
| 4,226,121 | 10/1980 | Knospler | 73/602 |
| 4,412,544 | 11/1983 | Beretsky et al. | 73/620 |

OTHER PUBLICATIONS

M. G. Silk, *Ultrasonic Transducers for Nondestructive Testing*, Adam Hilger Ltd., Bristol, 1984, pp. 74–75.

*Primary Examiner*—John E. Chapman
*Attorney, Agent, or Firm*—Louis E. Marn

[57] ABSTRACT

An ultrasound transducer generates a received signal in response to a reflected ultrasound signal. Polarity and phase information of the reflected ultrasound signal can be obtained by time-selectively amplifying the received signal with a specific gain function. The specific gain function is derived from the received signal itself and is independent of the polarity of the received signal.

19 Claims, 4 Drawing Sheets

APPARATUS FOR ULTRASOUND DETECTION

This is a continuation of application Ser. No. 07/289,616, filed Dec. 23, 1988, abandoned, which is a continuation of application Ser. No. 07/016,532, filed Feb. 19, 1987, abandoned.

The invention relates to an apparatus for ultrasound detection comprising an ultrasound transducer, means for generating an energizing signal for the transducer and means for detecting the signal received by the transducer after reflection.

Nowadays such apparatus for ultrasound detection are widely used for a variety of both medical and technical examinations. When used for medical purposes, ultrasound has the advantage that it does not adversely affect the patient's health, not even when applied for longer periods of time, and that the examination by means of ultrasound is non-invasive.

However, especially when applied medically there is the drawback that the image obtained by ultrasound detection will show only the contours of the bodily organs, so that a correct interpretation of the image requires great experience.

The reason that only an image showing contours is achieved is that hitherto it has appeared impossible, after reflection of a signal transmitted by the ultrasound transducer, to determine the phase of the reflected signal or even the polarity of this signal relative to the original signal. This phase and/or polarity information is fully lost in the conventional methods of electrical detection. Without such phase and/or polarity information it is impossible to determine whether a reflected ultrasound signal is the result of a reflection due to a transition from an acoustically denser medium to a less dense medium or just the other way round. Should it be possible to obtain such information from the reflected signal indeed, greys or even colors could be allocated to the ultrasound image regions between the contours, which would considerably enhance the clarity of the image and facilitate the interpretation thereof.

It is therefore an object of the invention to provide an apparatus for ultrasound detection that permits the determination of the phase and/or polarity of a reflected ultrasound signal. As a result, it is possible not only to detect whether the signal reflection is caused by a transition between an acoustically denser medium to a less dense medium or vice versa, but also to integrate the received signal for the purpose of providing information on the acoustic impedance.

To this end, the invention provides an apparatus of the above type in which the detection means are arranged for time-selectively amplifying the received signal with a gain function derived from the received signal, so that at any rate polarity information can be obtained from the signal received after reflection.

It is possible to obtain the desired polarity information from the received, reflected signal if the response characteristic of the transducer, during both transmission and reception, is known. It is true that the polarity information can be obtained from the received signal by subjecting this signal to a deconvolution computation on the basis of the known response characteristic, but it is highly time consuming to execute such a computation for each received signal. In fact, for obtaining an ultrasound image a large number of transmission pulses is emitted and each of these pulses results in reception signals of a number corresponding to the number of times that a transmitted signal is reflected during its passage through the body being examined. As the execution of a large number of such deconvolution computations is a time consuming affair, it is practically impossible to display the ultrasound image in real time, although this would be desirable indeed in a great many uses.

In accordance with the invention, preferably the energizing signal is so shaped with due regard to the response characteristic of the transducer that the received, reflected signal will have such a desired, predetermined shape that at any rate the polarity of the signal can be determined therefrom in a simple manner. Besides allowing a far higher processing rate than possible if the received signals are to be subjected afterwards to deconvolution computations, the system according to the invention entails the additional advantage that the spectral energy distribution of the received signal is considerably wider than when executing such computations, so that an enhanced signal-to-noise ratio is achieved for certain spectral regions. This phenomenon has been described by J. H. Kim et al in the article "Prior inverse filtering for high-resolution pulse-echo images" in Acoustical Imaging, Vol. 14, pages 447–458.

Although the present invention is being described in terms of one ultrasound transducer receiving a reflected signal, it will be clear to the worker in the art that when using a so-called array of ultrasound transducers energized by means of signals that may or may not be shifted in phase relative to each other, the signal received by this array after reflection may be regarded as a single signal that can be processed in the manner of the invention for deriving polarity information therefrom.

The invention will now be described in greater detail with reference to the accompanying drawings, in which.

Figure 1:
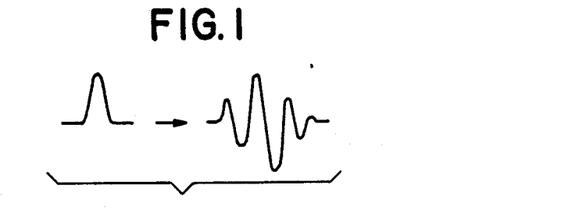
FIG. 1 schematically shows the shape of a transmission signal and of a signal received after reflection in a conventional ultrasound system.

FIG. 1 schematically shows an ultrasound transmission signal and a reflected signal received by an ultrasound transducer after the transmission signal has passed through a medium being examined and has been reflected from a transition in this medium. Although the received signal is shown in simplified form, it will be clear that the output signal of an ultrasound transducer cannot contain a DC voltage component, and that the detection of the polarity of the reflected signal relative to the transmission signal is extremely difficult.

Figure 2A:
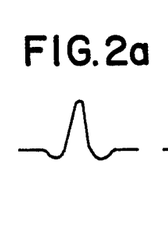
FIGS. 2a, b and c show possible, desired shapes of a reflected signal received by an ultrasound transducer.

FIG. 2a shows a reflected signal likewise having equal energy contents above and below zero amplitude level, but the polarity of which signal can be determined distinctly. It is difficult, however, to obtain a signal of such a shape and thus transducer, which exhibits a highly frequency-selective behaviour, has to be energized with extremely low frequencies. As a result, only a very small portion of the energy applied to the transducer is transmitted as the transmission signal, so that the signal-to-noise ratio deteriorates greatly, while a similar deterioration occurs again when the reflected signal is received by the transducer.

Figure 2B:
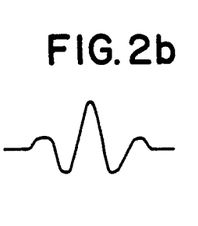
Figure 2C:
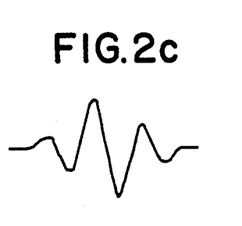

In accordance with the invention, however, it has appeared that it is possible indeed to compute a suitable transmission signal if one starts from a reflected signal having a shape as shown in FIG. 2b or 2c. Hereinafter, a signal having the shape of FIG. 2b will be called a symmetric signal and a signal having the shape of FIG. 2c an antisymmetric signal. Such signals contain polarity information that can be derived therefrom, although this requires some additional signal processing.

The energizing signal required in a transducer having a known response characteristic for achieving a reflected signal of a shape as shown in FIG. 2b or 2c, can be computed by the inverse filtering of the signal of FIG. 2b or that of FIG. 2c.

Assuming that:
g(t) = pulse response of the transducer;
f(t) = energizing signal for the transducer; and
h(t) = the reflected signal received by the transducer,
then h(t), the received reflected signal in the time domain, can be computed from the convolution of f(t) and g(t) in accordance with:

$$h(t) = \int_{\infty}^{\infty} f(t - \tau) \cdot g(\tau) \cdot d\tau \quad (1)$$

In the frequency domain there applies accordingly:

$$H(f) = F(f) \cdot G(f) \quad (2)$$

in which H(f), F(f) and G(f) are the Fourier transforms of h(t), f(t) and g(t), respectively.

It follows from equation 2 that:

$$F(f) = H(f)/G(f) \quad (3)$$

This equation represents the frequency characteristic of the inverse filter and, with a given desired H(f) and the known response characteristic G(f) of the transducer, it is possible through computer computations to determine the frequency characteristic of F(f) that results in the desired H(f).

Once the frequency characteristic of the energizing signal F(f) is known, the frequency components of this signal can be determined through frequency analysis, after which the signal can be generated, for example, by means of a conventional signal generator that is capable of producing a signal composed of a large number of different frequency components having different amplitudes and phase angles.

Figure 3A:
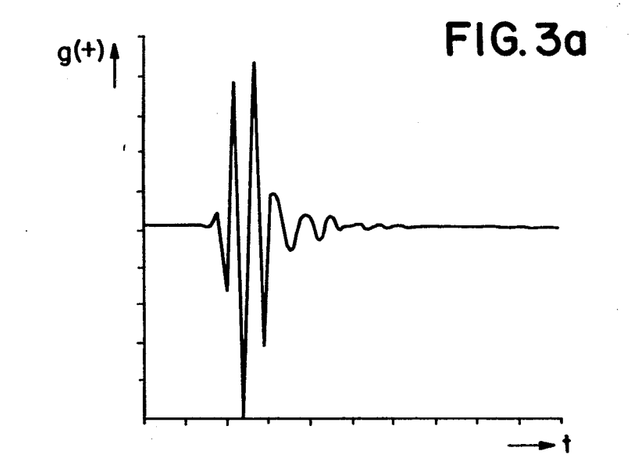
FIGS. 3a–d show representations in the time domain of, sucessively, the response of a transducer, a desired shape of the signal received after reflection, the shape of an energizing signal computed for obtaining the last-named signal, and the actual shape of the signal received after reflection.
Figure 3B:
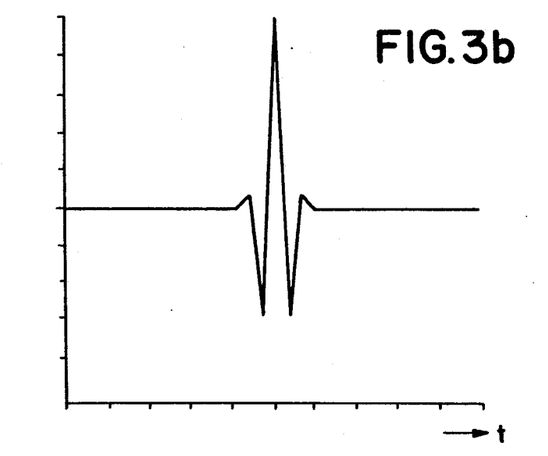
Figure 3C:
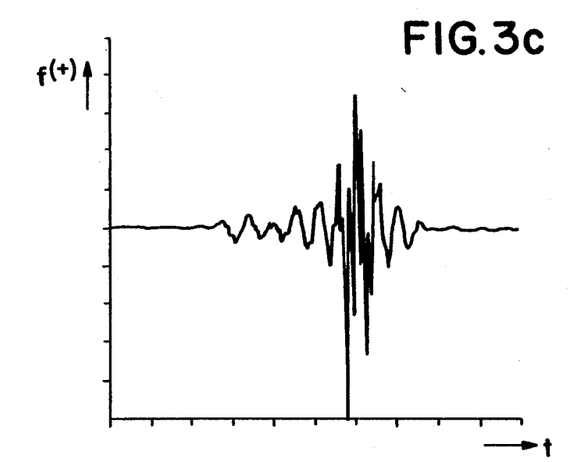
Figure 3D:
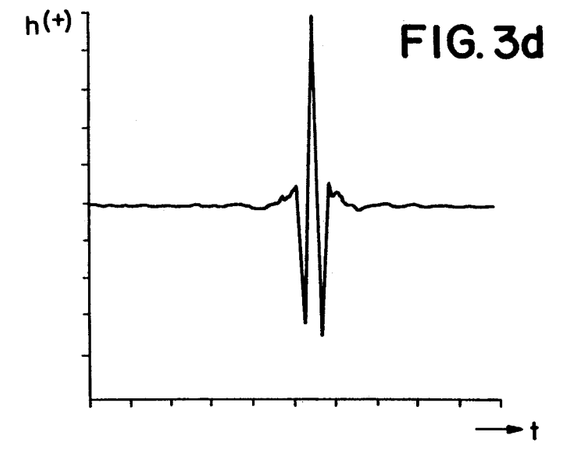

FIGS. 3a–d are graphical representations in the time domain of examples of the response characteristic of an ultrasound transducer (FIG. 3a); a desired shape of the reflected signal received by the transducer (FIG. 3b); the energizing signal computed in accordance with equation 3 (FIG. 3c); and the actual signal received after reflection (FIG. 3d). Self-evidently, different shapes of the desired received signal are possible, as long as this signal has a proper signal-to-noise ratio and a convenient, i.e., distinctly detectable, positive/negative ratio. Also, in general the duration of the transmitted signal will be relatively short as otherwise a reflected signal may be received while the energizing signal has not yet terminated.

Figure 4A:
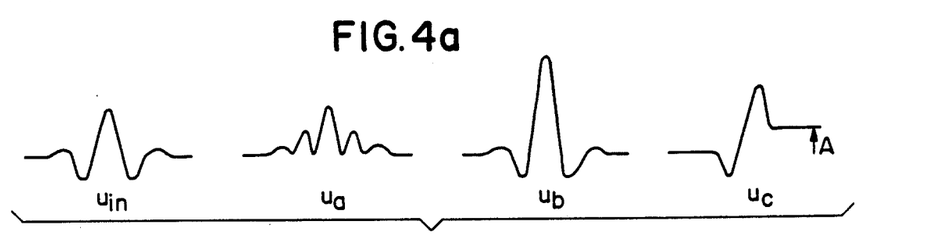
FIG. 4a schematically shows a representation of possible signal shapes in an apparatus according to the invention.
Figures 4B, 5A:
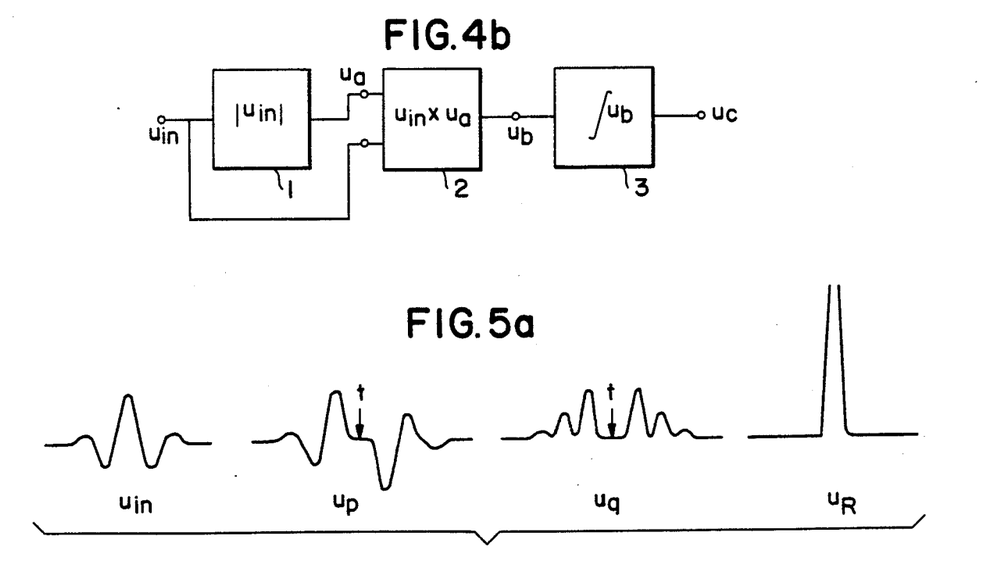
FIG. 4b shows a block diagram of a circuit in which the signal shapes of FIG. 4a can be formed.
FIG. 5a schematically shows a representation of further possible signal shapes in an apparatus according to the invention.
Figure 5B:
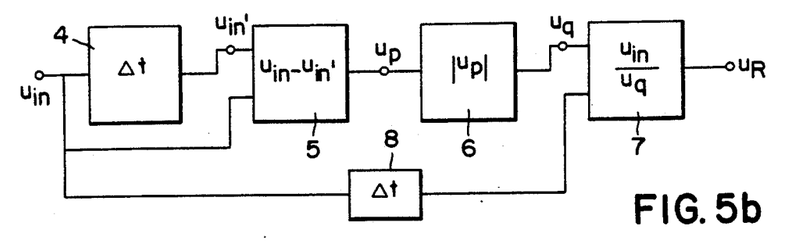
FIG. 5b shows a block diagram of a circuit in which the signal shapes of FIG. 5a can be formed.

With reference to FIGS. 4, 5, 6 and 7, hereinafter it will be described in what manner polarity information can be obtained from, on the one hand, the signal denoted by $u_{in}$ in FIGS. 4, 5 and 6, which signal is a schematic version of the symmetric signal of FIG. 3d, and, on the other hand, the antisymmetric signal $u_{in}$ of FIG. 7a.

In the embodiments of FIGS. 4, 5 and 6 polarity information is obtained from signal $u_{in}$ by time-selective amplification. The gain factor used in this time-selective amplification is time-dependent on the signal to be amplified as this gain factor is derived from this signal.

FIG. 4a shows the successive signal shapes occurring in a circuit shown in FIG. 4b, by means of which the polarity information can be obtained from signal $u_{in}$. The signal shapes are denoted in FIG. 4a by $u_{in}$, $u_a$, $u_b$ and $u_c$, respectively, while FIG. 4b shows where these signal shapes occur in the circuit.

The operation of the circuit of FIG. 4b is as follows. Signal $u_{in}$ is produced by the ultrasound transducer in response to the ultrasound signal received by this transducer after reflection in the body. Signal $u_{in}$ does not contain a DC voltage component. This signal is applied to the input terminal of a circuit 1 operative to perform full-wave rectification and to so present at its output terminal a signal $u_a$ that is the modulus of the input signal, consequently $u_a = |u_{in}|$. Signal $u_{in}$ is further applied to one input terminal of a multiplier circuit 2 having signal $u_a$ applied to its other input terminal. Consequently, a signal $u_b = u_{in}u_a = u_{in}|u_{in}|$ is presented at the output terminal of circuit 2. As the multiplication results in the positive peak of signal $u_{in}$ being amplified by a greater factor than the negative peaks, an effective DC voltage is obtained whose polarity is related unambiguously to that of $u_{in}$. Signal $u_b$ is applied to the input terminal of an integrator circuit 3 operative to present a signal $u_c = \int u_b dt = \int u_{in}|u_{in}|dt$ at its output terminal, which signal likewise provides information on the polarity of $u_{in}$ as after integration a DC voltage jump A is obtained whose magnitude is proportional to the square of input voltage $u_{in}$. Thus in FIG. 4, auxiliary signal $u_a$ is derived from the received signal $u_{in}$ is twice the base frequency of the received signal $u_{in}$ where $u_a = abs(u_{in})$, abs is a time-independent operation and $u_{in}$ is multiplicative.

FIGS. 5a and 5b show another manner in which polarity information can be derived from the ultrasound signal received after reflection. Just as in FIG. 4b, in the circuit of FIG. 5b it is indicated where the signal shapes $u_p$, $u_q$ and $u_r$ shown in FIG. 5a occur.

In the circuit of FIG. 5b signal $u_{in}$ is applied to the input terminal of a delay circuit 4 operative to delay the input signal by a period of time substantially equal to one cycle of signal $u_{in}$. The output signal $u_{in}'$ of this circuit; which signal is not shown in FIG. 5a as, apart from being shifted in time, it is identical to $u_{in}$, is applied to the inverting input terminal of a subtractor circuit 5 having signal $u_{in}$ applied to its non-inverting input terminal. Circuit 5 presents at its output terminal a signal $u_p$ of such a shape that around point of time t a signal is obtained whose amplitude is substantially equal to zero. Signal $u_p$ is applied to the input terminal of a circuit 6 operative to perform full-wave rectification and to so present at its output terminal a signal $u_q = |u_p|$. Signal $u_q$ is applied to an input terminal of a divider circuit 7 having signal $u_{in}$ applied to its other input terminal, which signal $u_{in}$ has been so delayed in a delay circuit 8 that its positive peak coincides in time with point of time t in signal $u_q$. Divider circuit 7 presents at its output terminal a signal $u_r = u_{in}/u_q$, which signal has the shape shown in FIG. 5a. On account of the division of signal $u_{in}$ by signal $u_q$ in circuit 7, signal $u_{in}$ round point of time t is amplified by a large factor as the amplitude of signal $u_q$ round point of time t is substantially zero. Signal $u_r$ thus contains a large DC voltage component which is related unambiguously to the polarity of $u_{in}$. Moreover, signal $u_r$ permits a highly accurate determination of the spot where reflection occurred as this signal $u_r$ is of considerably shorter duration than signal $u_{in}$.

Although signal $u_p$, which actually is a convolution of signal $u_{in}$, can be obtained in a highly simple manner by means of circuits 4 and 5 shown in FIG. 5b, it will be clear to the worker in the art that there are numerous other manners in which such a signal can be realized.

Another method of deriving from signal $u_{in}$ a signal that permits a determination of the polarity, is to use signal $u_b$ of FIG. 4a as an input signal for delay circuit 4 of FIG. 5b. As signal $u_b$ has a more distinct peak than signal $u_{in}$, the processing in the circuit arrangement of FIG. 5b results in an even more effective polarity signal. Thus in FIG. 5, the auxiliary signal $u_g$ is derived from the received signal $u_{in}$ and is twice the base frequency of the received signal $u_{in}$ wherein $u_q = abs(u_{in}\text{-shift}(u_{in}))$ abs and shift are time-independent predetermined functions and shift $(u_{in}/u_q)$ is divisional.

Yet another method is to apply signal $u_b$ of FIG. 4a to a filter and to subject the output signal of the filter to a root extracting operation. The resultant signal can be further processed either directly or after integration. The signal shapes resulting from such an operation are shown in FIGS. 6a–e.

Figure 6A:
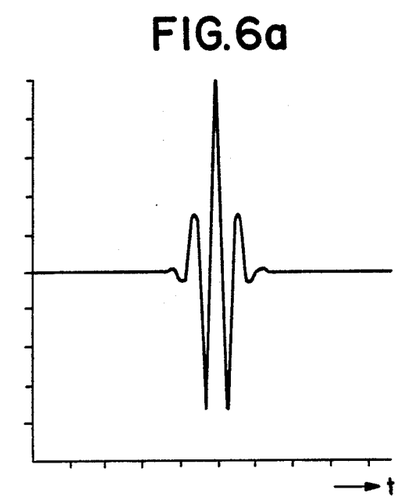
FIGS. 6a–e show a representation of yet further signal shapes in an apparatus according to the invention.
Figure 6B:
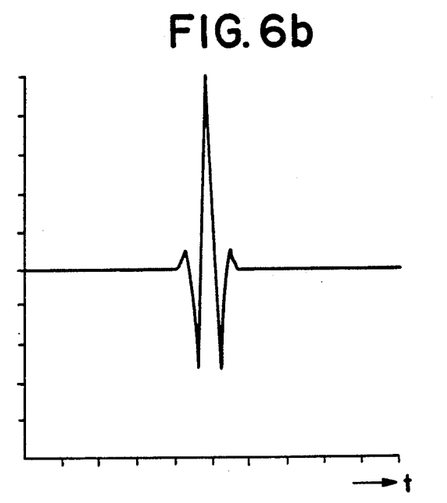
Figure 6C:
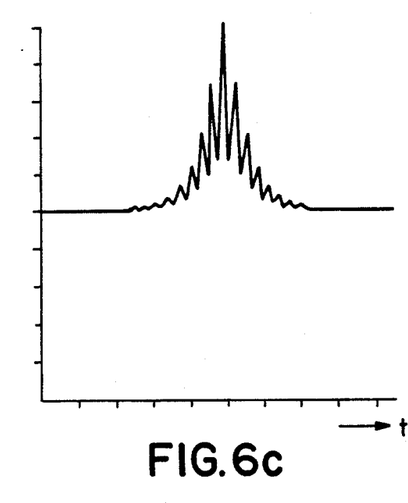
Figure 6D:
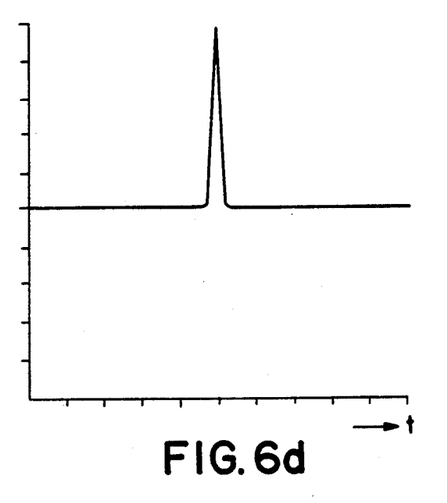
Figure 6E:
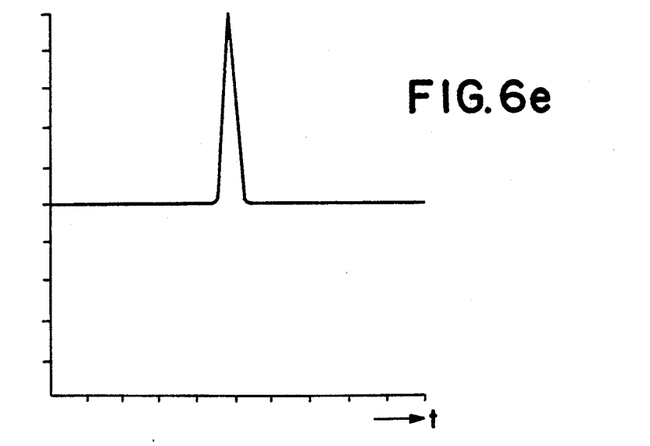

FIG. 6a shows the ultrasound signal received after reflection, which signal is comparable to signal $u_{in}$ of FIG. 4a. FIG. 6b shows the signal $u_b$ obtained after rectification in circuit 1 and multiplication in circuit 2 of FIG. 4b. FIG. 6c shows the characteristic of a filter used for filtering signal $u_b$, and FIG. 6d shows the output signal obtained after filtering. Finally, FIG. 6e shows the signal resulting after extracting the root from the signal of FIG. 6d, which resultant signal contains highly distinct polarity information and exhibits a linear relationship to signal $u_{in}$ and is therefore directly indicative of the magnitude of the acoustic impedance causing the reflection.

For the further processing of the time-selectively amplified signal, in general a linear relationship between the DC voltage component in signal $u_c$ (FIG. 4a) or $u_r$ (FIG. 5a) and input voltage $u_{in}$ may be desired to allow computation of the magnitude of the acoustic impedance causing the reflection.

In signal $u_c$ in FIG. 4a the magnitude of DC voltage jump A is proportional to the square of $u_{in}$. By extracting the root from signal $u_b$ in an additional circuit, again a linear relationship between the output signal and $u_{in}$ can be obtained.

In signal $u_r$ in FIG. 5a the output voltage is independent of the amplitude of $u_{in}$. By multiplying $u_r$ by, for example, the envelope of signal $u_a$ of FIG. 4a, again a proportionality between the output signal and $u_{in}$ can be realized.

A further, particularly useful method is to divide $u_b$ of FIG. 4a by $u_q$ of FIG. 5a. So, the central peak value in the pulse benefits both from the multiplication and from the division, so that a highly distinct polarity signal is obtained, while signal $u_b/u_q$ is still directly proportional to the input voltage.

FIG. 7 shows in successive FIGS. 7a–h how polarity information can be obtained in a sophisticated manner by several signal operations, starting from an antisymmetric signal produced by the ultrasound transducer.

Figure 7A:
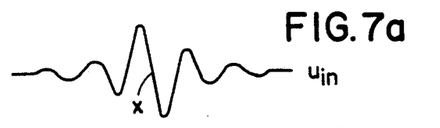
FIGS. 7a–h show a representation of even more further signal shapes in an apparatus according to the invention.

FIG. 7a shows an antisymmetric signal produced by the ultrasound transducer after reflection. It will be clear that the computation of the energizing signal for the transducer is realized in the same manner as described above with reference to a symmetric reception signal.

Figure 7B:
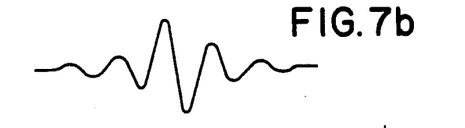

FIG. 7b shows the same signal as FIG. 7a though delayed by half a cycle in known per se manner.

Figure 7C:
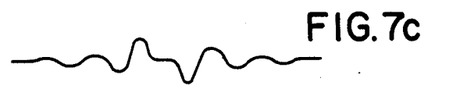

FIG. 7c shows the signal obtained by adding the signals of FIGS. 7a and 7b. In fact, the signal of FIG. 7c constitutes the crux of the signal processing method described here, as starting from an input signal as shown, for example, in FIG. 7a, just as in the embodiment of FIG. 5, the object is to obtain a signal exhibiting substantially zero amplitude during part of its duration. The signal 7 of FIG. 7d is derived by the full wave rectification of the signal of FIG. 7c.

Figure 7D:
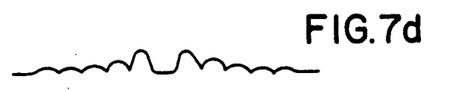
Figure 7E:
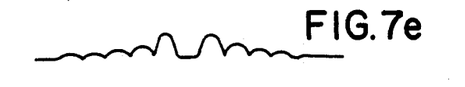

The signal of FIG. 7e is identical to that of FIG. 7d though delayed by half a cycle.

Figure 7F:
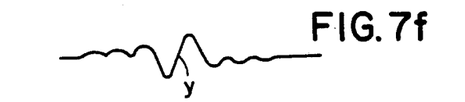

FIG. 7f shows the signal obtained by adding the signals of FIGS. 7d and 7e. The shape of this signal is fully independent of the polarity of the signal of FIG. 7a and is the same or twice the base signal of the received signal $u_{in}$.

Figure 7G:
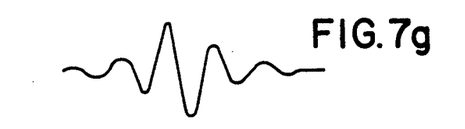

Part y in FIG. 7f has the same base frequency as FIG. 7a. The operation in each case leading from $u_{in}$ to the auxiliary signal and shown in FIG. 7 clearly shows that the shape of the received signal is independent of the polarity of the received signal. The time independent predetermined functions are abs (u) referring to rectification and shift (u) in shifting the signal over a half a period of the received signal; $7f \times 7g$ (=shift (7a)) being multiplicative.

FIG. 7g shows a signal equal to that of FIG. 7a though delayed in such a manner that the zero crossing x of the signal of FIG. 7a coincides with the zero crossing y of the signal of FIG. 7f.

Figure 7H:
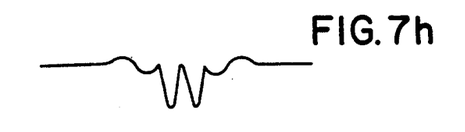

Finally, FIG. 7h shows the signal obtained by the multiplication of the signal of FIG. 7f and that of FIG. 7g. This signal includes four half cycles each having a desired polarity.

Such a polarity determination, in which several cycles have the proper polarity, is useful for achieving a proper S/N ratio. For example, signal $u_r$ of FIG. 5a allows a good position determination but has a less proper S/N ratio as only a single cycle provides polarity information whereas the original signal $u_{in}$ includes several cycles. It will therefore be clear from the above that, in dependence upon the desired use, either the position determination may be optimal, in which case one has to put up with a lesser S/N ratio, or the S/N ratio may be optimal, in which case the position determination will be less accurate.

It is observed, however, that the position determination by means of the signal of FIG. 7h will nevertheless be more accurate than the position determination afforded by the signal of FIG. 7a as, due to the different processing steps, the duration of the polarity information in the signal of FIG. 7h has become shorter than the duration of the entire, originally received signal. A further advantage is that of the six half cycles covered by the signal of FIG. 7h, the first and the last half cycle have a polarity opposite to that of the other half cycles. As a result, when using the signal of FIG. 7h an intensification of the contours in the image is obtained, which enhances the clarity thereof and which, moreover, is surprising as, normally speaking, a received pulse will provide a less sharp contour as its duration is longer.

The amplitude of the signal of FIG. 7h is proportional to $(u_{in})^2$, in which $u_{in}$ is the signal shown in FIG. 7a. If, as explained above, a linear relationship is desired between the amplitude of the signal of FIG. 7a and that of FIG. 7h, one of these two signals may be subjected to root extraction.

The principle elucidated with reference to FIGS. 7a–7h can be extended if, instead of four half cycles indicative of the proper polarity as present in the signal of FIG. 7h, for example six of such periods are desired. In that case it suffices to delay the signal of FIG. 7c by one-and-a-half cycle and to add this signal to that of FIG. 7c, after which the processing steps described above with reference to FIGS. 7d–7h can be executed.

As the worker in the art will be readily able to design a circuit arrangement capable of successively realizing the signal shapes of FIGS. 7b–7h on the basis of the signal of FIG. 7a, such a circuit arrangment will not be described here.

Although the signal processing according to FIGS. 7a–7h has been described above with reference to an input signal of antisymmetric shape, it is possible to apply such processing to a signal of symmetric shape, for example the signal shown in FIG. 2b. A first method is then to differentiate the symmetric signal in order to achieve an antisymmetric signal to be processed in the manner of FIG. 7. Another method is to apply the symmetric signal to a circuit performing a so-called Hilbert transformation. This means that the input signal is multiplied by a signal X(f), in which $X(f) = -i$ when $f > 0$ and $x(f) = i$ when $f < 0$. A further method is to delay the symmetric signal by half a cycle and to so attenuate this signal that the summation of the symmetric signal and the delayed symmetric signal results in a signal of the shape shown in FIG. 7c. This signal can then be further processed in the manner described with reference to FIGS. 7d–7h.

Finally, it is also possible to so process signals having shapes other than a purely antisymmetric or purely symmetric one, that a signal is obtained that exhibits substantially zero amplitude during part of its duration.

Figure 8A:
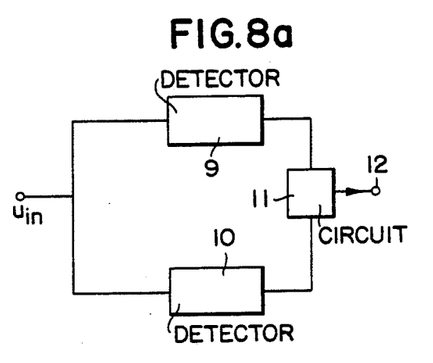
FIGS. 8a and 8b schematically show the manner in which phase information can be derived from a received ultrasound signal.
Figure 8B:
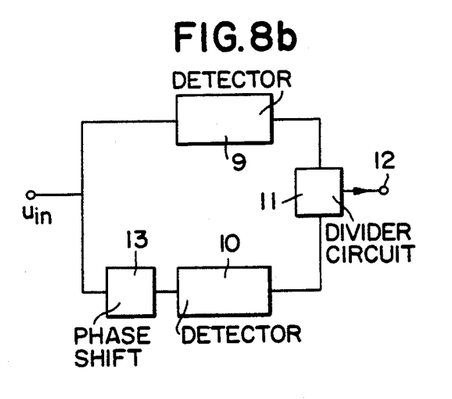

In practice, an ultrasound signal received by an ultrasound transducer after reflection will have neither a purely antisymmetric nor a purely symmetric shape. However, each received signal can be decomposed into an antisymmetric and a symmetric signal component. It has further appeared that the magnitude of the output voltage of a detector, for example a detector operating in the manner explained in FIG. 7, is in a sinusoidal relation to the phase angle of the input signal. FIGS. 8a and 8b show the manner in which from an arbitrary signal received by an ultrasound transducer after reflection, information can be derived on the phase shift occuring in this signal between the transmission thereof by the transducer and the reception thereof after reflection. To this end, the received signal $u_{in}$ is applied to a circuit arrangement comprising a first detector 9 operative to produce an output signal of maximum value in response to the application of an antisymmetric pulse to its input, which detector may operate in the manner described with reference to FIG. 7, and a second detector 10 operative to produce an output signal of maximum value in response to the application of a symmetric pulse to its input, which detector may have a structure identical to that of the detectors shown in FIGS. 4 and 5.

Alternatively, it is possible to use identical detectors for detectors 9 and 10, in which case means should be provided for realizing a phase shift of about 90° between the respective detector input signals, thus ensuring that detector 9 produces a maximum output signal in response to a purely antisymmetric input pulse and detector 10 produces a maximum output signal in response to a purely symmetric input pulse. It is also possible to realize a phase shift between the input signals that has a value different from 90°. However, this results in crosstalk between the two output signals, which crosstalk can be electronically eliminated in known per se manner. For example, it is possible to so construct detectors 9 and 10 that they operate in the manner described with reference to FIG. 7. In that case, a circuit 13 in FIG. 8b is connected between the input of detector 10 and the input terminal to which $u_{in}$ is applied, which circuit 13 realizes a phase shift of 90° between its input signal and its output signal. Such a circuit may be, as explained above, a differentiator or a Hilbert transformer. Detectors 9 and 10 produce a first and a second detector signal, respectively, which signals are sine and cosine shaped, respectively, in dependence upon the phase of the input signal, as explained above. For example, in the case of a purely antisymmetric signal the output signal of detector 9 is maximal and that of detector 10 is zero, while in the case of a purely symmetric signal the output signal of detector 10 is maximal and that of detector 9 is zero. By a division of the two detector signals in the divider circuit 11, a signal providing information on the phase of the input signal is produced at output terminal 12.

Although the foregoing presumes the use of a signal transmitted by an ultrasound transducer that has been so processed that, after reflection and reception by the ultrasound transducer, a signal of predetermined shape is obtained, it has appeared that, when using a conventional, i.e., non-processed, ultrasound transmission pulse, in certain cases the processing of the received signal in a manner according to the invention, for example the manner described above with reference to FIG. 7, is so accurate that even then phase information or at any rate polarity information can be derived from the received signal. Consequently, such applications employing a conventional ultrasound transmission pulse are considered to fall within the scope of the present invention as well.

In the foregoing it is further presumed that no dispersion occurs during the propagation of ultrasound waves through a medium under examination, so that the shape of the signal is independent of the distance traversed. It is possible, however, that due to such dispersion the waveform varies as a function of the distance to such an extent that a single shape of the transmission signal no longer suffices. In these cases it is often possible, however, to determine a separate polarity signal by which the reception signal detected intraditional manner can be multiplied.

If the polarity is not or hardly measurable, for example in the event of relatively high ultrasound frequencies that are desired for obtaining a proper resolution but result in a relatively poor S/N ratio, it is possible to first make a polarity image at a relatively low ultrasound frequency and to later combine this image with the image obtained in conventional manner at higher ultrasound frequencies.

We claim:

1. An apparatus for ultrasound detection comprising an ultrasound transducer, means for generating an energizing signal for said transducer, means for detecting a signal received by said ultrasound transducer after reflection, said detection means comprising means for determining polarity of said received signal, said polarity determining means comprising means for deriving an auxiliary signal from said received signal, said means for deriving an auxiliary signal comprising rectifying means, said auxiliary signal having the same or twice the base frequency as said received signal, having a shape independent of polarity of said received signal and having an amplitude which at any point of time is a time-independent predetermined function of the amplitude of the received signal at one or more corresponding points of time and said polarity determining means further comprising means for performing a multiplicative operation with said auxiliary signal on said received signal.

2. An apparatus according to claim 1 wherein said energizing signal generating means produces a signal shaped to the response characteristic of said ultrasound transducer to produce a signal received after reflection of a predetermined shape necessary to obtain said polarity information.

3. An apparatus according to claim 2 wherein G(f) is frequency responsive characteristic of said ultrasound transducer and H(f) is said frequency characteristic of said predetermined shape of a signal received after reflection, a frequency characteristic F(f) of said transducer being defined by:

$$F(f) = H(f)/G(f).$$

4. The apparatus according to claim 1 wherein said means for performing a multiplicative operation comprises means for multiplying said received signal with said auxiliary signal.

5. An apparatus according to claim 1 wherein said means for performing a multiplicative operation comprises means for dividing said received signal by said auxiliary signal.

6. An apparatus according to claim 1 including at least two parallel signal paths, means in a first one of said signal paths for operating upon the signal in said first path, combining means for combining the signals exiting from said first and second paths, the operating and combining means being operative such that after combining the signals from the first and second signal paths into said auxiliary signal said auxiliary signal is of substantially zero amplitude during part of its duration.

7. The apparatus according to claim 6 wherein said means operating on said signal in said first path comprises delaying means for delaying said signal in said first path by a predetermined number of half cycles and said combining means being operatively connected to add said delayed signal to or subtract said delayed signal from said signal in said second path.

8. The apparatus according to claim 7 wherein said means for deriving said auxiliary signal from said received signal further includes means for forming a modulus of a signal resulting after addition or subtraction.

9. The apparatus according to claim 8 and further including means for dividing said received signal by said modulus of said signal resulting after subtraction, and time delay means for delaying said received signal by a predetermined period of time prior to division.

10. The apparatus according to claim 8 and further including means for delaying said modulus of said signal resulting after addition by half a cycle, means for subtracting said delayed signal from said modulus of said signal resulting after addition, means for multiplying said signal resulting after subtraction by said received signal, and time delay means for delaying said received signal by a predetermined period of time prior to multiplication.

11. The apparatus according to claim 1 wherein said detection means comprises means for determining a modulus of said received signal and means for forming a product of said received signal and said modulus of said received signal.

12. The apparatus according to claim 11 and further including means for integrating said product of said received signal and said modulus of said received signal.

13. The apparatus according to claim 11 and further including a filter for filtering said product of said received signal and said modulus of said received signal to form a filtered output signal and means generating as an output signal the root of said filtered output signal.

14. The apparatus according to claim 1 and further including first and second detection means having an input coupled to said ultrasound transducer and having an output for supplying a first and a second detection signal, respectively, and means for determining quotient of said first output signal and said second output signal to obtain information on a phase shift between said energizing signal and said received signal, said first detection means producing a first output signal of maximum value if said input thereto is an anti-symmetric signal and said second output means producing a second output signal of maximum value if said input thereto is a symmetric signal.

15. The apparatus according to claim 14 wherein said first and second detection means include identical detection circuits and further including means coupling said ultrasound transducer and at least one of said inputs to said first or second detection circuits, said coupling means establishing a phase shift of essentially 90° between said input to said first and second detection circuit, respectively.

16. The apparatus according to claim 15 wherein said phase shift establishing means includes a differentiator coupled between said ultrasound transducer and said input to said second detection circuit.

17. The apparatus according to claim 15 wherein said phase shift establishing means include a Hilbert transformer coupled between said ultrasound transducer and said input to said second detection circuit.

18. The apparatus according to claims 15, 16 or 17 wherein each detection circuit includes means for forming said auxiliary signal and comprises means for delaying said signal applied to said input to said detection circuit by a predetermined number of half cycles and further including, means for adding said delayed signal and said input signal, means for forming a modulus of said signal resulting after addition, means for delaying by half cycle said signal resulting after addition, and means for subtracting said delayed signal from said modulus of said signal resulting after addition to form said auxiliary signal; and wherein each of said detection means includes means for delaying said input signal by a predetermined period of time and means for multiplying said delayed input signal and said auxiliary signal to form a first and a second detection signal, respectively.

19. A method for ultrasound detection in which an ultrasound transducer is energized to transmit an ultrasound signal and a reflected ultrasound signal is received by said ultrasound transducer including the step of deriving an auxiliary signal from said received signal, said auxiliary signal having a same or twice the base frequency as said received signal, having a shape independent of polarity of said received signal and having an amplitude which at any point of time is a time independent predetermined function of said amplitude of said received signal at a corresponding point of time and performing a multiplicative operation with said auxiliary signal on said received signal.

* * * * *